(12) United States Patent
Kim (10) Patent No.: US 9,723,735 B1
(45) Date of Patent: Aug. 1, 2017

(54) KICKSTAND FOR PROTECTIVE CASE

(71) Applicant: SPIGEN KOREA CO., LTD., Seoul (KR)

(72) Inventor: Dae-Young Kim, Seoul (KR)

(73) Assignee: SPIGEN KOREA CO., LTD., Seoul (KR)

( * ) Notice: Subject to any disclaimer, the term of this patent is extended or adjusted under 35 U.S.C. 154(b) by 0 days.

(21) Appl. No.: 15/261,805

(22) Filed: Sep. 9, 2016

Related U.S. Application Data (60) Provisional application No. 62/351,933, filed on Jun. 18, 2016, provisional application No. 62/353,561, filed on Jun. 23, 2016.

(51) Int. Cl.
| | |
|---|---|
| *F16M 13/00* | (2006.01) |
| *H05K 5/02* | (2006.01) |
| *E05F 1/12* | (2006.01) |
| *E05D 11/10* | (2006.01) |
| *E05D 11/06* | (2006.01) |
| *E05D 3/02* | (2006.01) |
| *F16M 11/38* | (2006.01) |

(52) U.S. Cl.
CPC ............. *H05K 5/0234* (2013.01); *E05D 3/02* (2013.01); *E05D 11/06* (2013.01); *E05D 11/1014* (2013.01); *E05F 1/1207* (2013.01); *F16M 11/38* (2013.01)

(58) Field of Classification Search
CPC .... F16M 11/10; F16M 2200/08; F16M 13/00; F16M 13/02; F16M 11/12; F16M 2200/041; F16M 11/2014; F16M 11/2021; F16M 11/18; F16M 11/04; F16M 2200/024; F16M 11/24; F16M 11/041; F16M 2200/044

USPC .................. 248/454, 455, 127, 371, 372.1
See application file for complete search history.

(56) References Cited

U.S. PATENT DOCUMENTS

| 7,614,596 B2 * | 11/2009 | Takao | ............... F16M 11/10 248/176.3 |
| 7,841,575 B1 * | 11/2010 | Sliger | ............... F16M 11/10 248/454 |
| 8,714,772 B1 * | 5/2014 | Levante | ................ F21V 23/06 362/217.17 |

(Continued)

OTHER PUBLICATIONS

"Seidio ACTIVE Case (with metal kickstand) for HTC One X", Published on YouTube.com on May 16, 2012 [online] [retrieved on Feb. 28, 2017] Uploaded by MobileNations Gear [online], Retrieved from the Internet: <http://www.youtube.com/watch?v=W5EGPgGW7Hw>.

*Primary Examiner* — Steven Marsh
(74) *Attorney, Agent, or Firm* — East West Law Group; Heedong Chae (57) ABSTRACT

A kickstand for an electronic device includes a standing leg, a base and an adhesive provided on a surface of the base so that the base can be attached to the protective case. The kickstand further includes a shaft and the standing leg is pivoted on the base. The base includes a first opening and a second opening to receive both ends of the shaft, and the shaft is substantially in a shape of a cylinder and includes a head, a body, and a bottom. The shaft further includes a cylindrical hole formed on the bottom and a metal pin is received in the cylindrical hole. The diameter of the head is greater than that of the body. Additionally, the diameter of the bottom is greater than that of the body.

23 Claims, 10 Drawing Sheets

(56) References Cited

U.S. PATENT DOCUMENTS

| | | | |
|---|---|---|---|
| D706,254 S | 6/2014 | Chang | |
| 2010/0027204 A1* | 2/2010 | Chiang | G06F 1/1616 |
| | | | 361/679.01 |
| 2013/0016588 A1* | 1/2013 | O'Dell | G10K 11/006 |
| | | | 367/173 |
| 2013/0229100 A1* | 9/2013 | Siddiqui | G06F 1/1618 |
| | | | 312/326 |
| 2013/0286551 A1* | 10/2013 | Ashcraft | G06F 1/1679 |
| | | | 361/679.01 |
| 2013/0286623 A1* | 10/2013 | Slipy | H04M 1/0202 |
| | | | 361/807 |
| 2014/0332418 A1* | 11/2014 | Cheung | F16M 11/10 |
| | | | 206/45.2 |
| 2016/0066453 A1* | 3/2016 | Quehl | A45C 11/00 |
| | | | 206/45.2 |

\* cited by examiner

KICKSTAND FOR PROTECTIVE CASE

CROSS-REFERENCE TO RELATED APPLICATIONS

This application claims priority to U.S. provisional patent application No. 62/351,933, filed Jun. 18, 2016, and U.S. provisional patent application No. 62/353,561, filed Jun. 23, 2016, the disclosures of which are incorporated herein by reference in their entirety.

FIELD OF THE INVENTION

The present invention relates to a kickstand for a protective case which is intended for an electronic device such as a mobile phone, cell phone, smart phone, tablet computer, or the likes. The kickstand has an adhesive and thus, the kickstand is attachable to any kind of a protective case. Accordingly, the kickstand of the present invention can be sold separately, separate from a protective case, or together with a protective case. Alternatively, the kickstand may be directly attached to a back of an electronic device.

BACKGROUND OF THE INVENTION

Portable electronic devices, such as mobile phones, cell phones, smart phones, tablet computers or the likes, have become popular and widely used for communication, entertainment purposes and other purposes. These electronic devices are intended to be carried or moved about and as such, these devices are more likely to be accidentally dropped, hit, or scratched. To protect these electronic devices, protective cases have been introduced and widely used in connection with the devices. Such electronic devices usually have a screen, and to see the screen from a specific angle, many protective cases have a kickstand to prop up the case and electronic device.

However, a kickstand of a protective case usually is usually provided to a specific location of the protective case and constructed to have an open position and a closed position with a predetermined angle between the two positions. Thus, such kickstand cannot satisfy a user's need for various viewing angles for his electronic device or need for changing location of the kickstand with respect to the protective case.

Therefore, to solve the above problems, there is a need for a kickstand for a protective case which is attachable to any location of a protective case. This invention is directed to solve these problems and satisfy the long-felt need.

SUMMARY OF THE INVENTION

The present invention is directed to a kickstand for a protective case. The kickstand is attachable to any kind of protective case to prop up the protective case and an electronic device secured in the protective case. The kickstand can be attached to any location of a protective case. The electronic device may be a mobile phone, cell phone, smart phone, table computer, or the like. Alternatively, the kickstand may be directly attached to an electronic device to prop it up.

The object of the present invention is to provide a kickstand having a standing leg, a base and an adhesive provided on a surface of the base so that the base can be attached to a protective case.

Another object of the present invention is to provide a kickstand, having a standing leg, a base, and a shaft. The standing leg is pivoted on the base. The base includes a first opening and a second opening to receive both ends of the shaft, and the shaft is substantially in a shape of a cylinder and includes a head, a body, and a bottom. The shaft further includes a cylindrical hole formed on the bottom and a metal pin is received in the cylindrical hole. The diameter of the head is greater than that of the body. Additionally, the diameter of the bottom is greater than that of the body.

Still another object of the present invention is to provide a method to insert a cylindrical shaft into the first and second openings of the base and secure the cylindrical shaft to the base. The method includes the steps of inserting the cylindrical shaft through the first and second openings, hitting the head of the cylindrical shaft to insert the cylindrical shaft into the first and second openings and to fixedly secure the cylindrical shaft to the first opening, and inserting a metal pin into a cylindrical hole of the cylindrical shaft to fixedly secure the cylindrical shaft to the second opening. By this method, the cylindrical shaft can be fixedly secured to the first and second openings.

The advantages of the present invention are: (1) the kickstand of the present invention can be attached to any place of a protective case or an electronic device so that a user can select location for his convenience; (2) the kickstand of the present invention utilizes a spring mechanism and a magnetic force to open and close a standing leg of the kickstand, and thus it is easy and convenient to use; (3) the kickstand of the present invention can be used for any kind of protective cases; (4) the kickstand of the present invention has a complicated structure but can be conveniently and effectively manufactured; (5) the shaft of the kickstand has a unique structure to facilitate insertion and fixed attachment of the shaft to the base of the kickstand; (6) it is easy and convenient to fixedly secure the shaft to the base; and (7) the kickstand of the present invention is constructed to be slim and compact.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
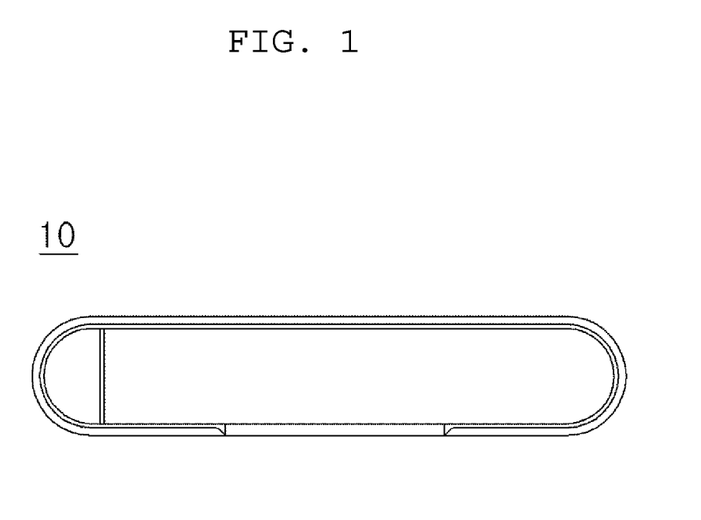
FIG. 1 shows a view of the kickstand of the present invention in a closed position.

The kickstand (10) of the present invention includes: a standing leg (20); a base (30), having a first surface (31) and a second surface (32), wherein the standing leg (20) is pivoted on the base (20); and an adhesive (not shown) provided on the second surface of the base for attaching the kickstand to a protective case. The adhesive can be any kind of adhesive including double-sided tape, glue or the likes. Here, the base (20) is preferably in a shape of plate as in FIGS. 1 or 2.

The kickstand further comprises a spring mechanism (40) to bias the standing leg (20) toward an open position of the standing leg (20), and the standing leg (20) and the base (30) are constructed to be magnetically attractable to each other. In a closed position of the standing leg (20), a magnetic force between the standing leg (20) and the base (30) is stronger than a tensile force of the spring mechanism (40) to maintain the closed position of the standing leg (20). However, in the open position of the standing leg (20), the tensile force of the spring mechanism (40) is stronger than the magnetic force between the standing leg (20) and the base (30) to maintain the open position of the standing leg (20). Therefore, the kickstand can be conveniently changed between an open position and a closed position using a finger.

The spring mechanism (40) comprises a helical spring (41) and a shaft (42) wherein the shaft (42) passes through the helical spring (41). The standing leg (20) comprises a first cylinder (21) and a second cylinder (22) and the shaft (42) passes through the first and second cylinders (21), (22). In addition, the first and second cylinders (21), (22) are on both sides of the helical spring (41). Here, the first and second cylinders (21), (22) are hollow cylinders.

Figure 7A:
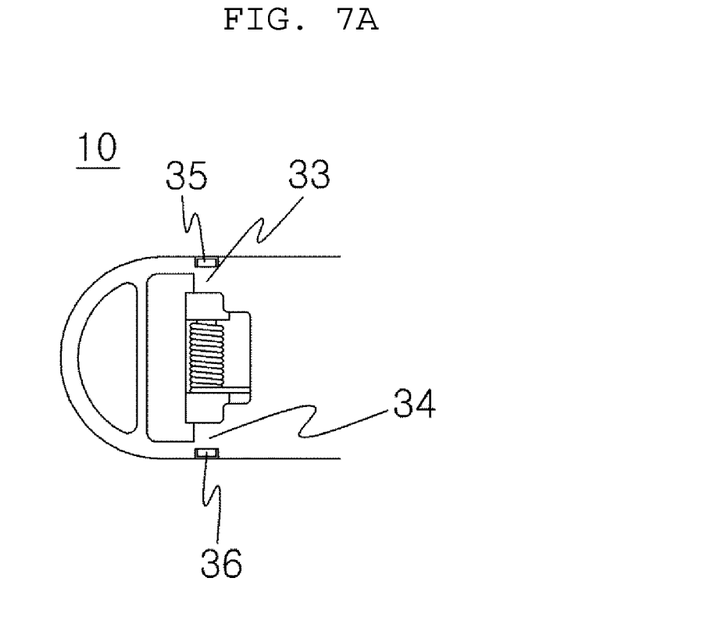
FIG. 7A shows an enlarged bottom view of the kickstand of the present invention in a closed position.
Figure 7B:
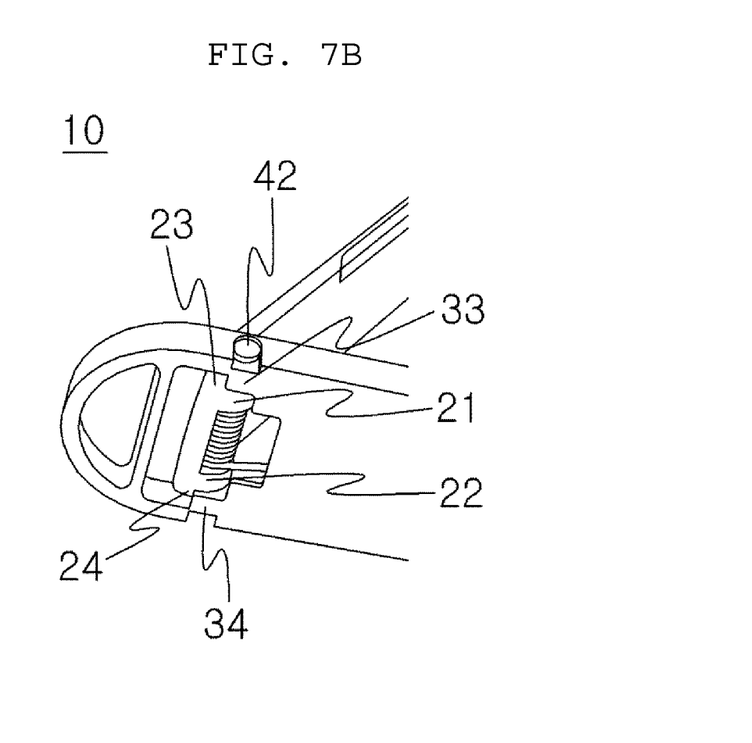
FIG. 7B shows an enlarged bottom perspective view of the kickstand of the present invention in an open position.

The standing leg (20) further comprises a first stopper (23) and a second stopper (24) respectively formed on outer sides of the first and second cylinders (21), (22) as shown in FIG. 7B. The base (30) comprises a first opening (35) and a second opening (36) to receive both ends of the shaft (42).

Figure 8:
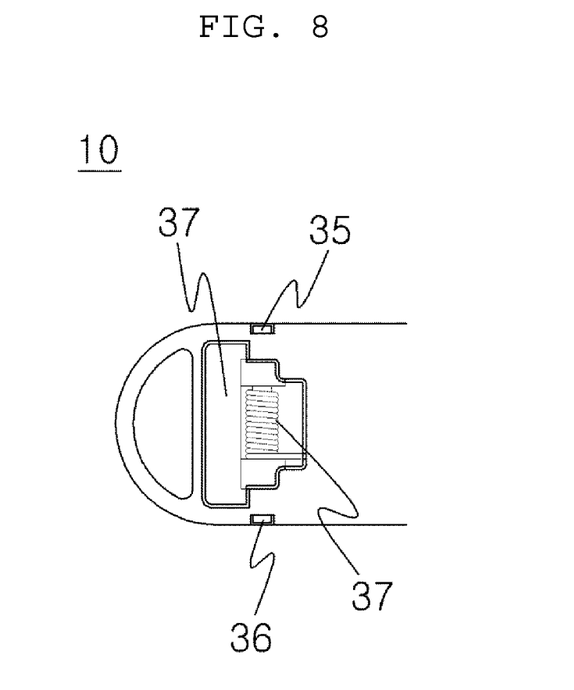
FIG. 8 shows the hole of the base illustrated in a double-lined boundary.

The base (30) comprises a hole (37) to provide a space for partially receiving the helical spring (41) and the first and second cylinders (21), (22). The hole (37) is illustrated in double-lined enclosure or boundary as in FIG. 8. The hole (37) partially receives the helical spring (41) and the first and second cylinders (21), (22), and because of this structure, the kickstand of the present invention becomes thinner and slimmer.

The base (30) further comprises a third stopper (33) and a fourth stopper (34) provided on opposite sides of the hole (37) of the base (30). In the open position of the standing leg (20), the first stopper (23) is in contact with the third stopper (33) and the second stopper (24) is in contact with the fourth stopper (34) for preventing the standing leg (20) from rotating beyond a predetermined angle. As shown in FIG. 7B, when the standing leg (20) rotates, the first and second stoppers (23), (24) rotate together, and if the standing leg (20) rotates to a predetermined angle, then the first and second stoppers (23), (24) respectively become in contact with and against the third and fourth stopper (33), (34) and the resistance caused by these contacts prevents the standing leg (20) from rotating further.

Furthermore, the third stopper (33) forms a lower boundary of the first opening (35) and the fourth stopper (34) forms a lower boundary of the second opening (36). Accordingly, the third and fourth stoppers (33), (34) form boundary of the hole (37) and at the same time boundary of the openings (35), (36). Because of this structure, the base (30) can be molded at a time.

The standing leg (20) has a magnet (29) and the base (30) has a ferromagnetic member (39) so that the standing leg (20) and the base (30) are constructed to be magnetically attractable to each other. The ferromagnetic member (39) is made of steel, stainless, iron or ferromagnetic metal plate.

Alternatively, the base (30) has a magnet (39) and the standing leg (20) has a ferromagnetic member (29) so that the standing leg (20) and the base (30) are constructed to be magnetically attractable to each other. The ferromagnetic member (29) is made of steel, stainless, iron or ferromagnetic metal plate.

Alternatively, the standing leg (20) has a magnet (29) and the base (30) has a magnet (39) as well so that the standing leg (20) and the base (30) are constructed to be magnetically attractable to each other.

The base (30) may have a recess (not shown) formed on the second surface (32) to receive the adhesive therein.

Alternatively, the base (30) may have a substantially enclosed rib (not shown) formed on the second surface (32) to receive the adhesive therein. The adhesive can be any type of adhesives. Preferably, the adhesive is a double-sided tape. One side of the double-sided tape is attached to the base and the other side may be covered with a film. When in use, the film may be peeled off and the tape is attached to a protective case or an electronic device. For example, one side of the double-sided tape is attached to the second surface of the base and the other side of the double-sided tape is covered with a peel off backing so that the other side of the double-sided tape can be attached to the protective case after peeling off the peel off backing. In addition, at least one side of the peel off backing may be extended beyond the second surface (32) of the base (30) for each peeling off of the peel off backing using a finger. The extended part is easy to be held by a finger. The peel off backing may be a release liner such as siliconized papers or films, or the likes.

Figure 2:
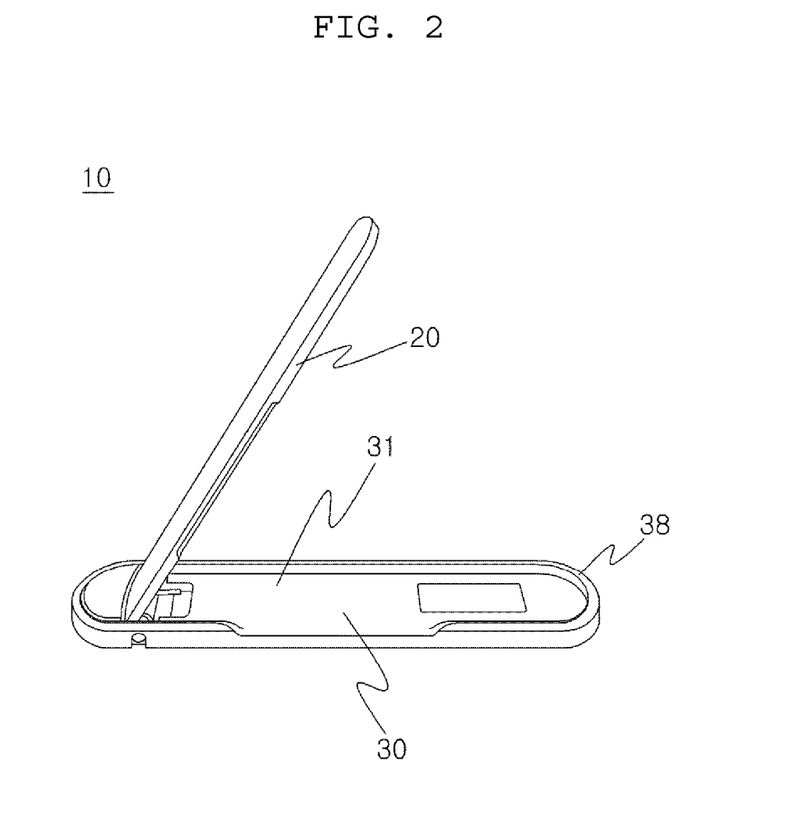
FIG. 2 shows a perspective view of the kickstand of the present invention in an open position.
Figure 3:
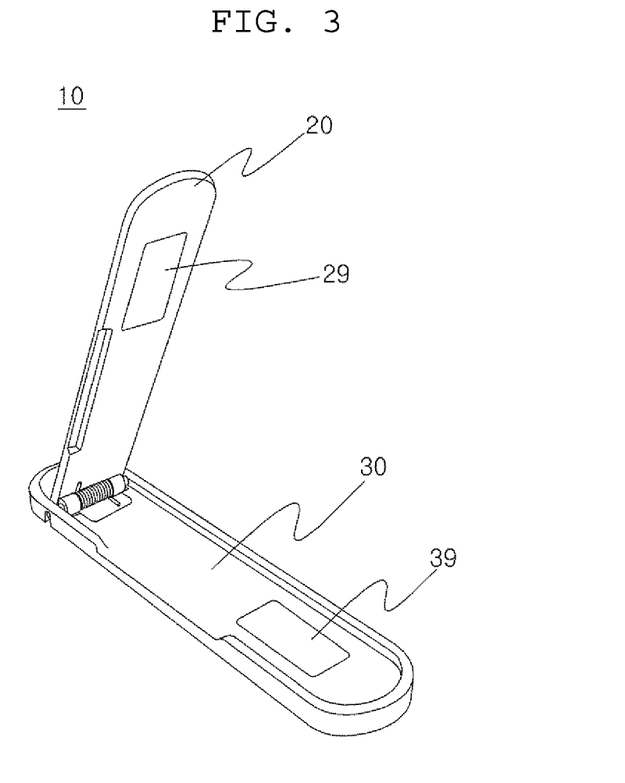
FIG. 3 shows another perspective view of the kickstand of the present invention in an open position.
Figure 4:
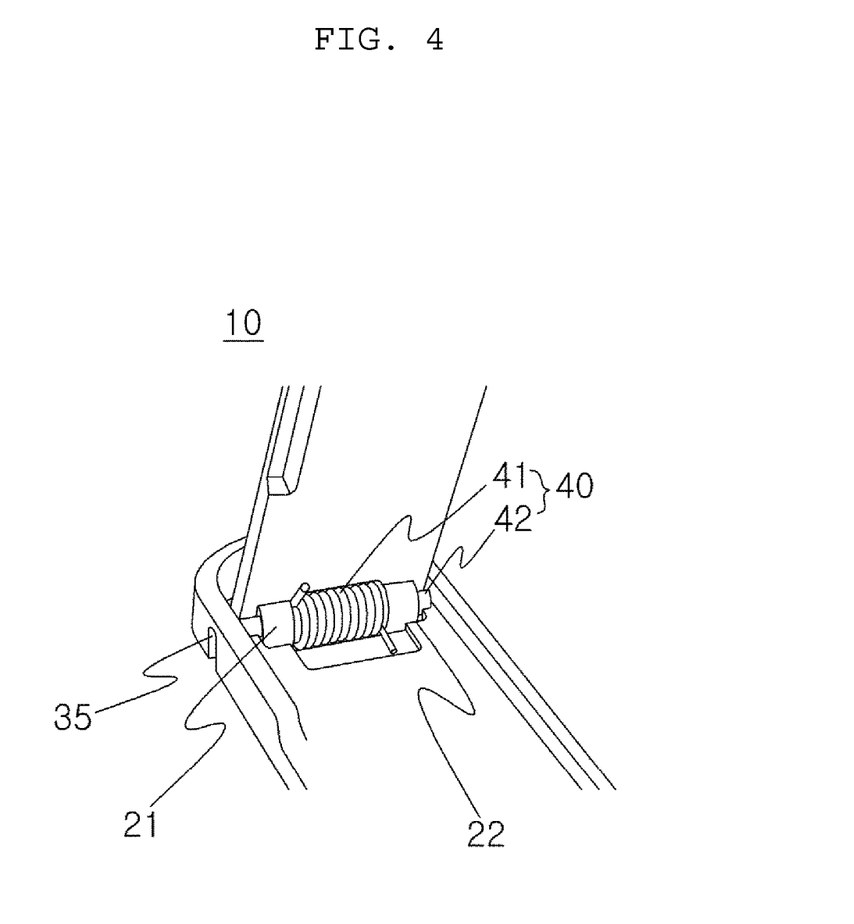
FIG. 4 shows an enlarged view of the kickstand of the present invention in an open position showing the spring mechanism.
Figure 5:
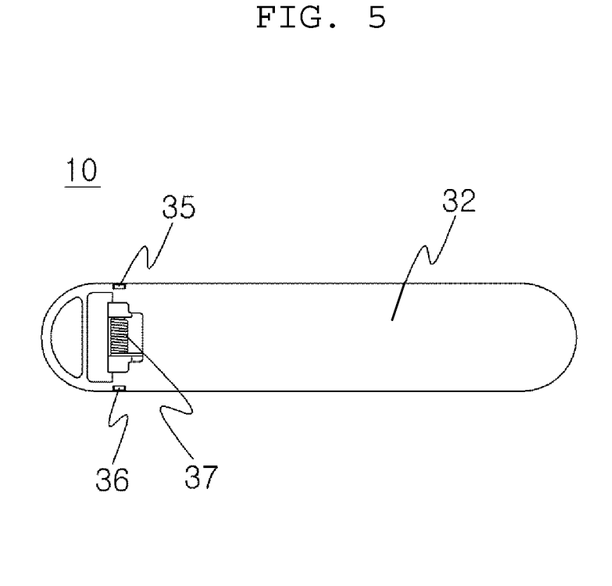
FIG. 5 shows a bottom view of the kickstand of the present invention in a closed position.
Figure 6:
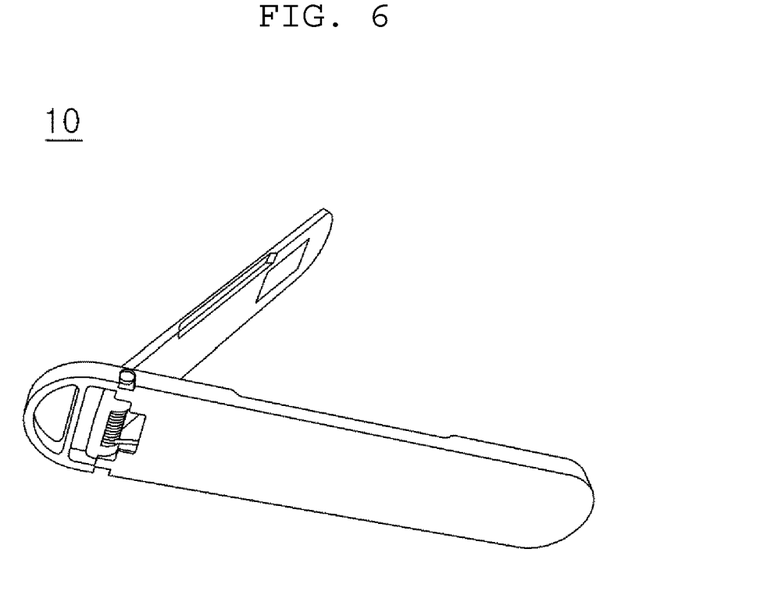
FIG. 6 shows a bottom perspective view of the kickstand of the present invention in an open position.

As in FIG. 2, the base (30) has an outer boundary rib (38) to receive the standing leg (20) therein when the standing leg (20) is in a closed position of the standing leg (20). The outer boundary rib (38) has an open area where the outer boundary rib is not formed for insertion of a finger into the open area to open the standing leg (20) from a closed position to an open position. The standing leg (20) comprises a recess (28)

formed at an area corresponding to the open area for insertion of a finger into the recess (28) to open the standing leg (20) from a closed position to an open position.

The standing leg (20) may be made of plastic or metal, except the magnet or ferromagnetic member.

The base (30) may be made of plastic or metal, except the magnet or ferromagnetic member.

Figure 9A:
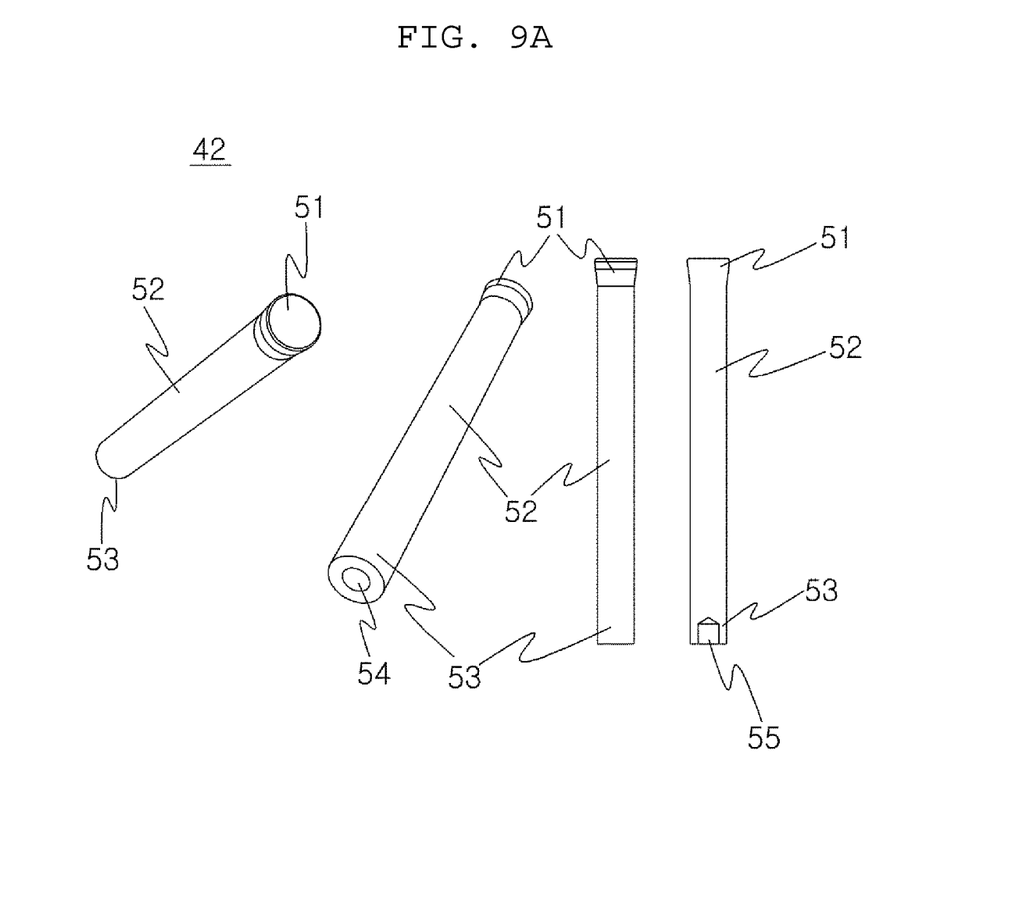
FIGS. 9A and 9B show various views of the shaft of the kickstand.
Figure 9B:
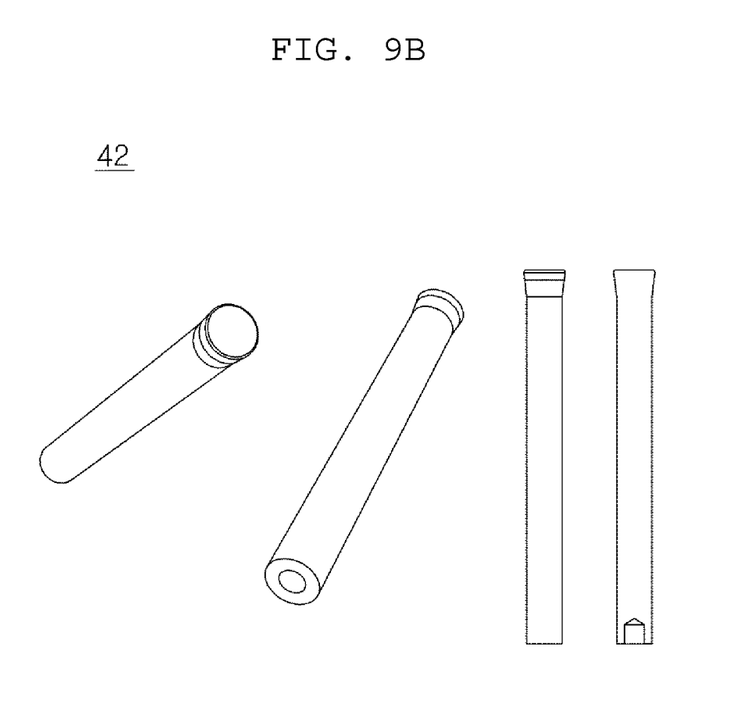

FIGS. 9A and 9B show various view of the shaft (42). The kickstand (10) comprises: a standing leg (20); a base (30) wherein the standing leg (20) is pivoted on the base (20); and a shaft (42). The base (30) comprises a first opening (35) and a second opening (36) to receive both ends of the shaft (42) and the shaft (42) is substantially in a shape of a cylinder. The shaft (42) comprises a head (51), a body (52), and a bottom (53) and further comprises a cylindrical hole (54) formed on the bottom (53). A metal pin (55) is driven into and received in the cylindrical hole (54) as shown in FIG. 9A.

A diameter of the head (51) is greater than that of the body (52). The diameter of the head (51) is greater than that of the first opening (35) or that of the second opening (36). Preferably, the diameter of the head (51) is greater than that of the first opening (35) and greater than that of the second opening (36).

The present invention provides a method to insert a cylindrical shaft (42) into first and second openings (35), (36) of a base (30) and secure the cylindrical shaft (42) to the base (30). The method to insert a cylindrical shaft (42) into first and second openings (35), (36) of a base (30) and secure the cylindrical shaft (42) to the base (30) wherein a kickstand comprises the base (20) and a standing leg (20) and the standing (20) is pivoted on the base (30), the method comprising the steps of: inserting the cylindrical shaft (42) through the first and second openings (35), (36) wherein the shaft (42) comprises a head (51), a body (52), and a bottom (53); hitting a head (51) of the cylindrical shaft (42) to insert the cylindrical shaft (42) into the first and second openings (35), (36) and to fixedly secure the cylindrical shaft (42) to the first opening (35) wherein a diameter of the head (52) is greater than that of the first opening (35) before the step of hitting the head (51) of the cylindrical shaft (42), and the diameter of the first opening is enlarged after the step of hitting the head (51) of the cylindrical shaft (42); and inserting a metal pin (55) into a cylindrical hole (54) of the cylindrical shaft (42) to fixedly secure the cylindrical shaft (42) to the second opening (36) wherein a diameter of a bottom (53) of the shaft (42) is smaller than that of the second opening (36) before the step of inserting the metal pin (55) into the cylindrical hole (54) and a diameter of the cylindrical hole (54) is enlarged after the step of hitting the metal pin (55) into the cylindrical hole (54) to fixedly secure the bottom (53) to the second opening (36). In this way, the shaft (42) can be inserted and fixed secured to the base (30).

The diameter of the cylindrical hole (54) is smaller than the diameter of the metal pin (55) before the step of inserting the metal pin (55) into the cylindrical hole (54), and the diameter of the second opening (36) is enlarged after the step of inserting the metal pin (55) into the cylindrical hole (54).

The metal pin (55) may be a pin, a bolt, or a rivet.

The cylindrical hole (54) may be formed on the bottom (53) only, or formed on the bottom (53) and the body (52), or formed on the bottom (53), the body (52) and the head (51) where the head (51) is covered.

The shaft (42) may be made of metal.

The shaft (42) may further pass through a first cylinder (21) of the standing leg (20), a helical spring (41), and a second cylinder (22) of the standing leg (20). In other words, the shaft (42) passes through in the order of the first opening (35), the first cylinder (21), the helical spring (41), the second cylinder (22), and the second opening (36).

In the embodiment of FIGS. 1~8, the shaft (42) may be in the shape of FIGS. 9A and 9B. To fixedly secure the shaft (42) to the base (30), first, insert the shaft (42) into the first opening (35), the first (hollow) cylinder (21), the helical spring (41), the second (hollow) cylinder (22), and the second opening (36). Then, hit the head (51) with a tool like a hammer so that the head (51) is fixedly secured to the first opening (35). Originally, the diameter of the head (51) is greater than that of the first opening (35) and after hitting, the diameter of the first opening (35) is enlarged and the head (51) becomes fixedly secured to the first opening (35). Then, a metal pin (55) is inserted into the cylindrical hole (54) by hitting the metal pin (55) with a tool like a hammer. Originally, the diameter of the metal pin (55) is greater than the diameter of the cylindrical hole (54) and after hitting, the diameter of the cylindrical hole (54) is enlarged and the diameter of the bottom (53) becomes enlarged as well. As the diameter of the bottom (53) is enlarged, the bottom (53) becomes fixedly secured to the second opening (36). Preferably, when the metal pin (55) is inserted into the cylindrical hole (54 by hitting the metal pin (55) with a tool like a hammer, the head (51) is placed against a hard material to prevent the head (51) from being slipped out of the first opening (35).

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A kickstand (10) for a protective case, comprising:
a standing leg (20);
a base (30), having a first surface (31) and a second surface (32), wherein the standing leg (20) is pivoted on the base (20);
an adhesive provided on the second surface of the base for attaching the kickstand to a protective case; and
a spring mechanism (40) to bias the standing leg (20) toward an open position of the standing leg (20), wherein the standing leg (20) and the base (30) are constructed to be magnetically attractable to each other, wherein in a closed position of the standing leg (20), a magnetic force between the standing leg (20) and the base (30) is stronger than a tensile force of the spring mechanism (40) to maintain the closed position of the standing leg (20), and
wherein in the open position of the standing leg (20), the tensile force of the spring mechanism (40) is stronger than the magnetic force between the standing leg (20) and the base (30) to maintain the open position of the standing leg (20),
wherein the spring mechanism (40) includes a helical spring (41) and a shaft (42) wherein the shaft (42) passes through the helical spring (41),
wherein the base (30) comprises a hole (37) for partially receiving the helical spring (41) therein.

2. The kickstand of claim 1,
wherein the standing leg (20) comprises a first cylinder (21) and a second cylinder (22) wherein the shaft (42) passes through the first and second cylinders (21), (22) and the first and second cylinders (21), (22) are on both sides of the helical spring (41), wherein the hole (37) partially receives the first and second cylinders (21), (22) therein.

3. The kickstand of claim 2, wherein the standing leg (20) further comprises a first stopper (23) and a second stopper (24) respectively formed on outer sides or the first and second cylinders (21), (22), wherein the base (30) comprises a first opening (35) and a second opening (36) to receive both ends of the shaft (42), wherein the base (30) further comprises a third stopper (33) and a fourth stopper (34) provided on opposite sides of the hole (37) of the base (30), wherein in the open position of the standing leg (20), the first stopper (23) is in contact with the third stopper (33) and the second stopper (24) is in contact with the fourth stopper (34) for preventing the standing leg (20) from rotating beyond a predetermined angle.

4. The kickstand of claim 3, wherein the third stopper (33) forms a lower boundary of the first opening (35) and the fourth stopper (34) forms a lower boundary of the second opening (36).

5. The kickstand of claim 1, wherein the standing leg (20) has a magnet (29) and the base (30) has a ferromagnetic member (39) so that the standing leg (20) and the base (30) are constructed to be magnetically attractable to each other.

6. The kickstand of claim 1, wherein the base (30) has a magnet (39) and the standing leg (20) has a ferromagnetic member (29) so that the standing leg (20) and the base (30) are constructed to be magnetically attractable to each other.

7. The kickstand of claim 1, wherein the base (30) has a recess or a substantially enclosed rib which is formed on the second surface (32) to receive the adhesive therein.

8. The kickstand of claim 1, wherein the adhesive is a double-sided tape.

9. The kickstand of claim 8, wherein one side of the double-sided tape is attached to the second surface of the base and the other side of the double-sided tape is covered with a peel off backing so that the other side of the double-sided tape can be attached to the protective case after peeling off the peel off backing, wherein at least one side of the peel off backing is extended beyond a boundary of the second surface of the base for each peeling off of the peel off backing using a finger.

10. The kickstand of claim 1, wherein the base (30) has an outer boundary rib (38) to receive the standing leg (20) therein when the standing leg (20) is in the closed position of the standing leg (20).

11. The kickstand of claim 9, wherein the outer boundary rib (38) has an open area where the outer boundary rib is not formed for insertion of a finger into the open area to open the standing leg (20) from a closed position to an open position, and wherein the standing leg (20) comprises a recess (28) formed at an area corresponding to the open area for insertion of a finger into the recess (28) to open the standing leg (20) from a closed position to an open position.

12. A kickstand (10), comprising:
a standing leg (20);
a base (30) wherein the standing leg (20) is pivoted on the base (20); and
a shaft (42);
wherein the base (30) comprises a first opening (35) and a second opening (36) to receive both ends of the shaft (42), wherein the shaft (42) is substantially in a shape of a cylinder and comprises a head (51), a body (52), and a bottom (53),
wherein the shaft (42) further comprises a cylindrical hole (54) formed on the bottom (53) and a metal pin (55) is received in the cylindrical hole (54), wherein a diameter of the head (51) is greater than that of the body (52).

13. The kickstand of claim 12, wherein the diameter of the head (51) is greater than that of the first opening (35) or that of the second opening (36).

14. The kickstand of claim 12, wherein a diameter of the bottom (53) is greater than that of the body (52).

15. A method to insert a cylindrical shaft (42) into first and second openings (35), (36) of a base (30) and secure the cylindrical shaft (42) to the base (30), wherein a kickstand comprises the base (20) and a standing leg (20), and the standing leg (20) is pivoted on the base (30), the method comprising the steps of:
inserting the cylindrical shaft (42) through the first and second openings (35), (36) wherein the shaft (42) comprises a head (51), a body (52), and a bottom (53),
hitting the head (51) of the cylindrical shaft (42) to insert the cylindrical shaft (42) into the first and second openings (35), (36) and to fixedly secure the cylindrical shaft (42) to the first opening (35) wherein a diameter of the head (52) is greater than that of the first opening (35) before the step of hitting the head (51) of the cylindrical shaft (42), and the diameter of the first opening is enlarged after the step of hitting the head (51) of the cylindrical shaft (42), and
inserting a metal pin (55) into a cylindrical hole (54) of the cylindrical shaft (42) to fixedly secure the cylindrical shaft (42) to the second opening (36) wherein a diameter of a bottom (53) of the shaft (42) is smaller than that of the second opening (36) before the step of inserting the metal pin (55) into the cylindrical hole (54) and a diameter of the cylindrical hole (54) is enlarged after the step of hitting the metal pin (55) into the cylindrical hole (54) to fixedly secure the bottom (53) to the second opening (36).

16. The method of claim 15, wherein the diameter of the cylindrical hole (54) is smaller than the diameter of the metal pin (55) before the step of inserting the metal pin (55) into the cylindrical hole (54), and wherein the diameter of the second opening (36) is enlarged after the step of inserting the metal pin (55) into the cylindrical hole (54).

17. The method of claim 15, wherein the metal pin (55) is a pin, a bolt, or a rivet.

18. The method of claim 15, wherein the cylindrical hole (54) is formed on the bottom (53) only, or formed on the bottom (53) and the body (52), or formed on the bottom (53), the body (52) and the head (51) where the head (51) is covered.

19. The method of claim 15, wherein the shaft (42) is made of metal.

20. The method of claim 15, wherein the shaft (42) further passes through a first cylinder (21) of the standing leg (20), a helical spring (41), and a second cylinder (22) of the standing leg (20), wherein the shaft (42) passes through in the order of the first opening (35), the first cylinder (21), the helical spring (41), the second cylinder (22), and the second opening (36).

21. A kickstand (10) for a protective case, comprising:
a standing leg (20);
a base (30), having a first surface (31) and a second surface (32), wherein the standing leg (20) is pivoted on the base (20); and
a spring mechanism (40) to bias the standing leg (20) toward an open position of the standing leg (20), wherein the standing leg (20) and the base (30) are constructed to be magnetically attractable to each other, wherein in a closed position of the standing leg (20), a magnetic force between the standing leg (20) and the base (30) is stronger than a tensile force of the spring mechanism (40) to maintain the closed position of the standing leg (20), wherein in the open position of the standing leg (20), the tensile force of the spring mechanism (40) is stronger than the magnetic force between the standing leg (20) and the base (30) to maintain the open position of the standing leg (20), wherein the spring mechanism (40) includes a helical spring (41) and a shaft (42) wherein the shaft (42) passes through the helical spring (41), wherein the base (30) comprises a hole (37) for partially receiving the helical spring (41) therein.

22. The kickstand (10) of claim 21, wherein the standing leg (20) comprises a first cylinder (21) and a second cylinder (22) wherein the shaft (42) passes through the first and second cylinders (21), (22) and the first and second cylinders (21), (22) are on both sides of the helical spring (41), wherein the hole (37) partially receives the first and second cylinders (21), (22) therein.

23. The kickstand (10) of claim 22, wherein the standing leg (20) further comprises a first stopper (23) and a second stopper (24) respectively formed on outer sides of the first and second cylinders (21), (22), wherein the base (30) comprises a first opening (35) and a second opening (36) to receive both ends of the shaft (42), wherein the base (30) further comprises a third stopper (33) and a fourth stopper (34) provided on opposite sides of the hole (37) of the base (30), wherein in the open position of the standing leg (20), the first stopper (23) is in contact with the third stopper (33) and the second stopper (24) is in contact with the fourth stopper (34) for preventing the standing leg (20) from rotating beyond a predetermined angle.

\* \* \* \* \*